3,000,051
METHOD AND APPARATUS FOR MANUFACTURE OF HOLLOW ARTICLES FROM TUBING
Wilbur A. Schaich, Maumee, Ohio, assignor to Owens-Illinois Glass Company, a corporation of Ohio
Filed Jan. 28, 1959, Ser. No. 789,564
18 Claims. (Cl. 18—5)

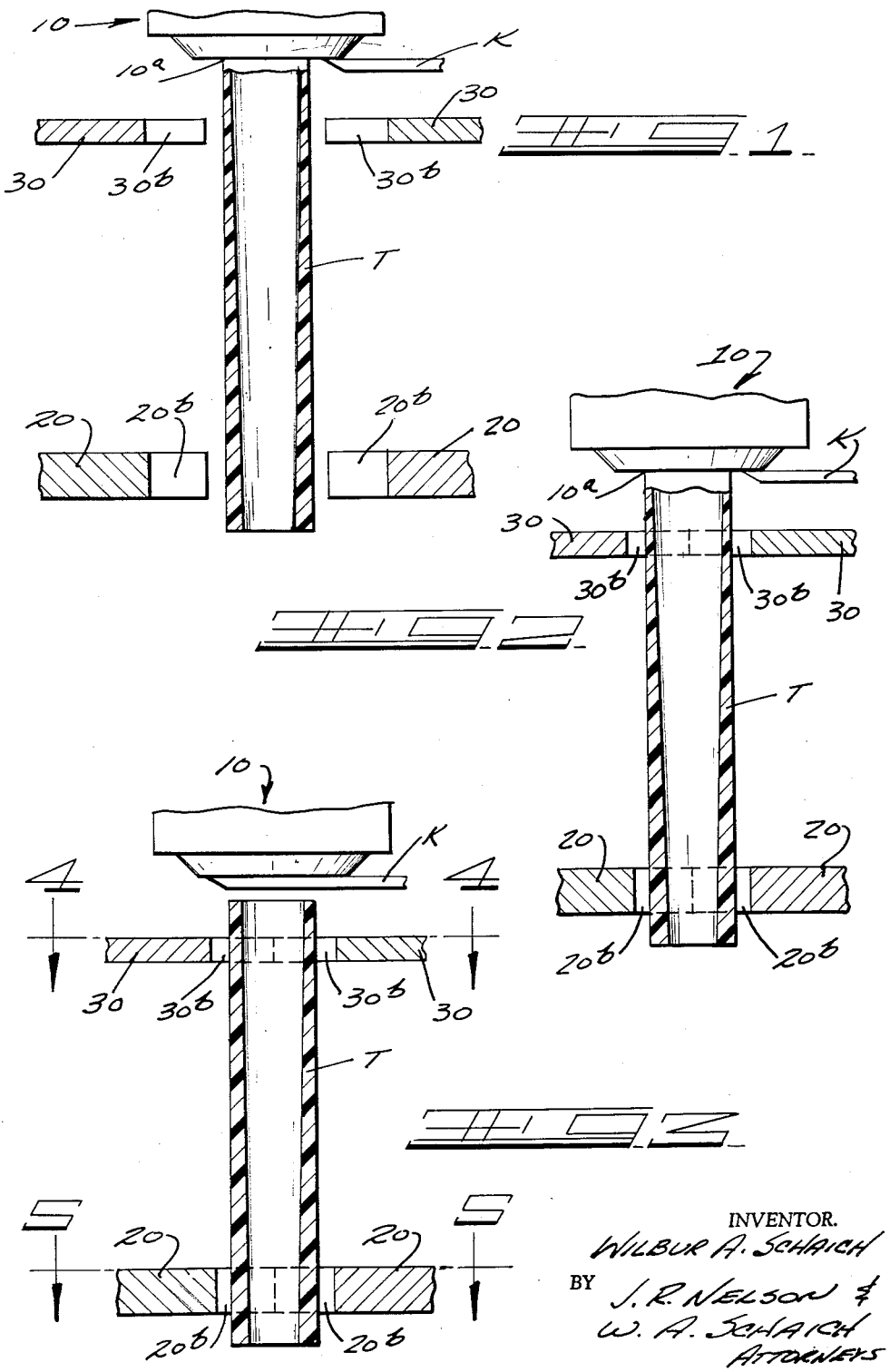

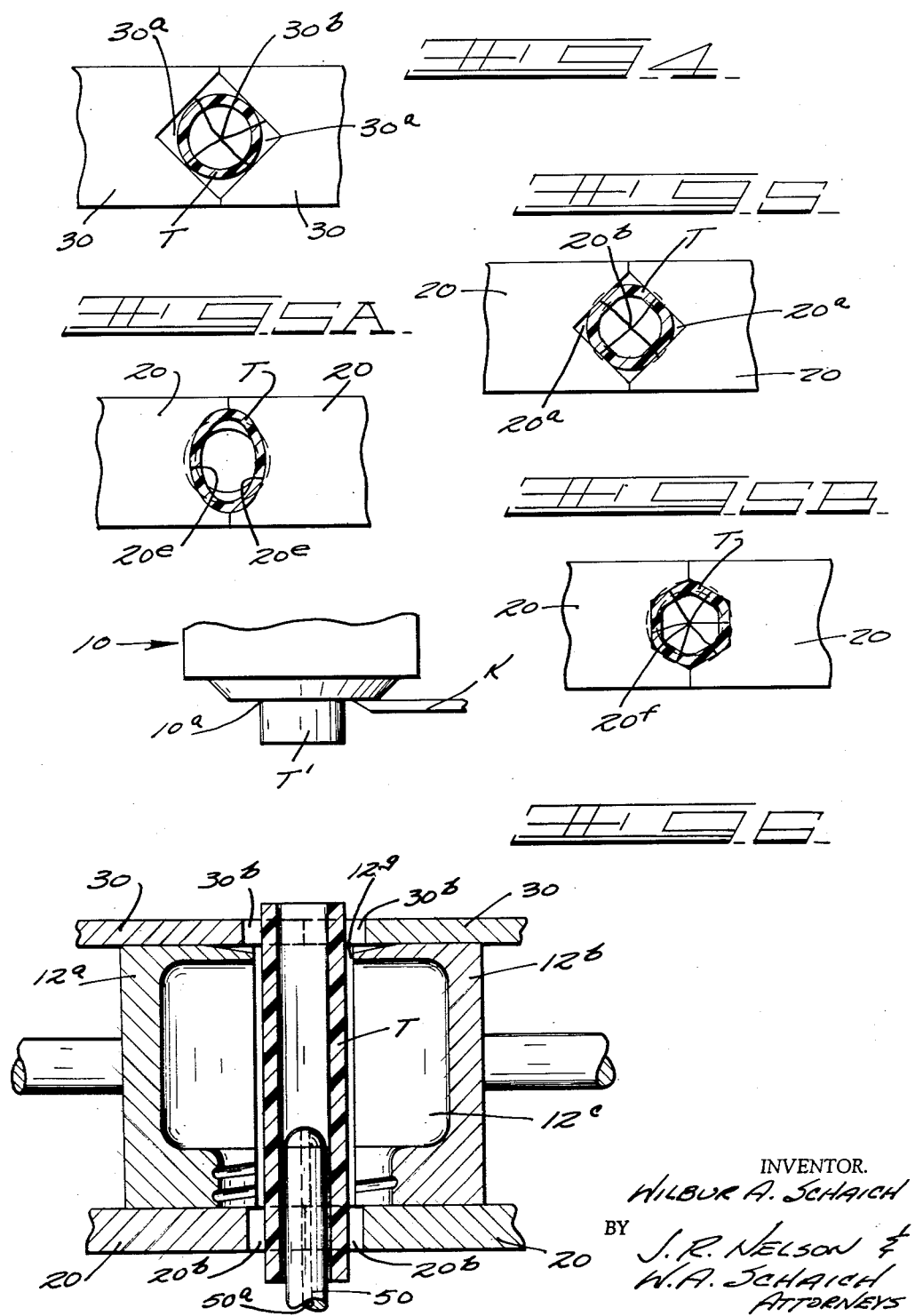

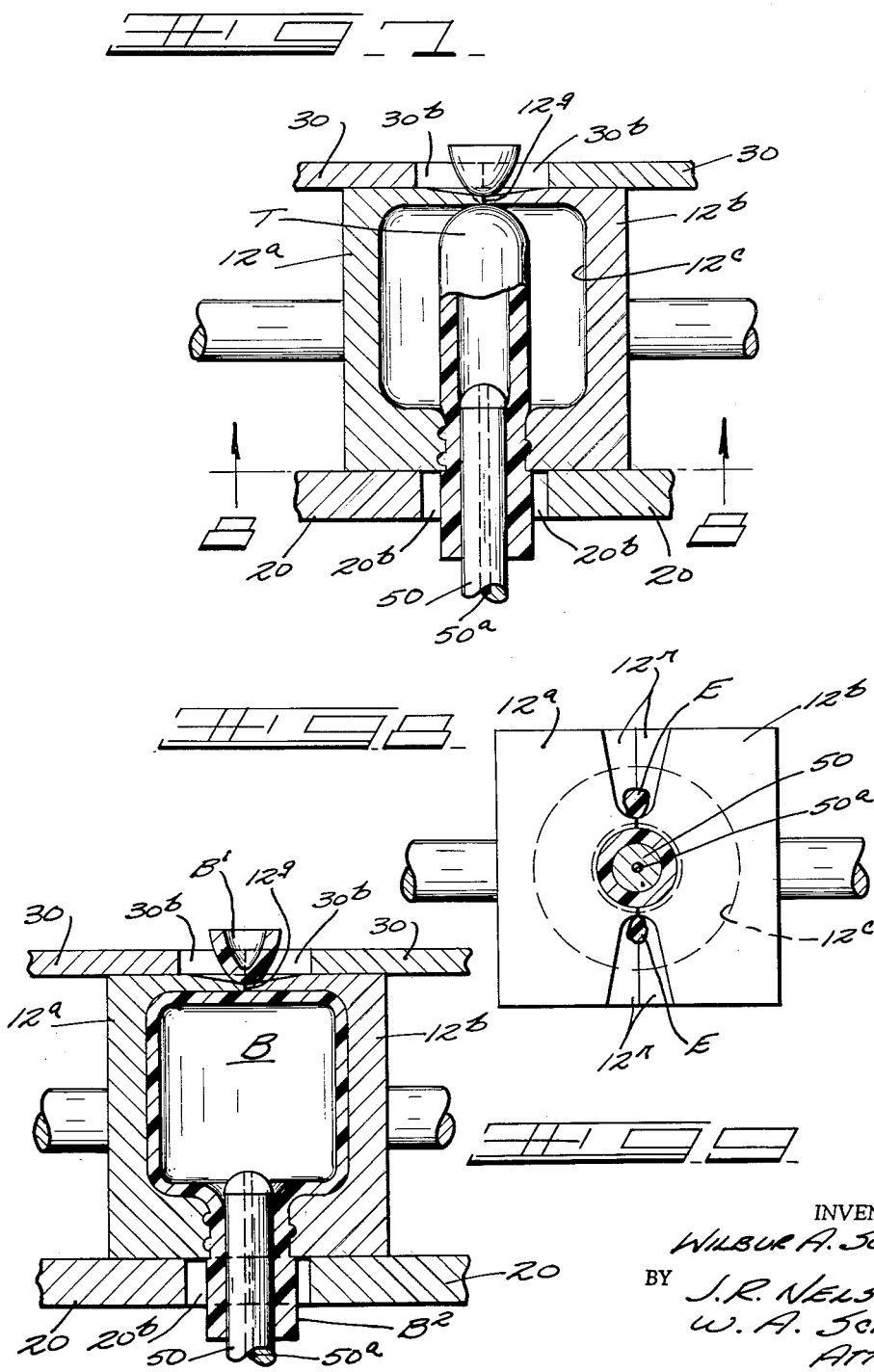

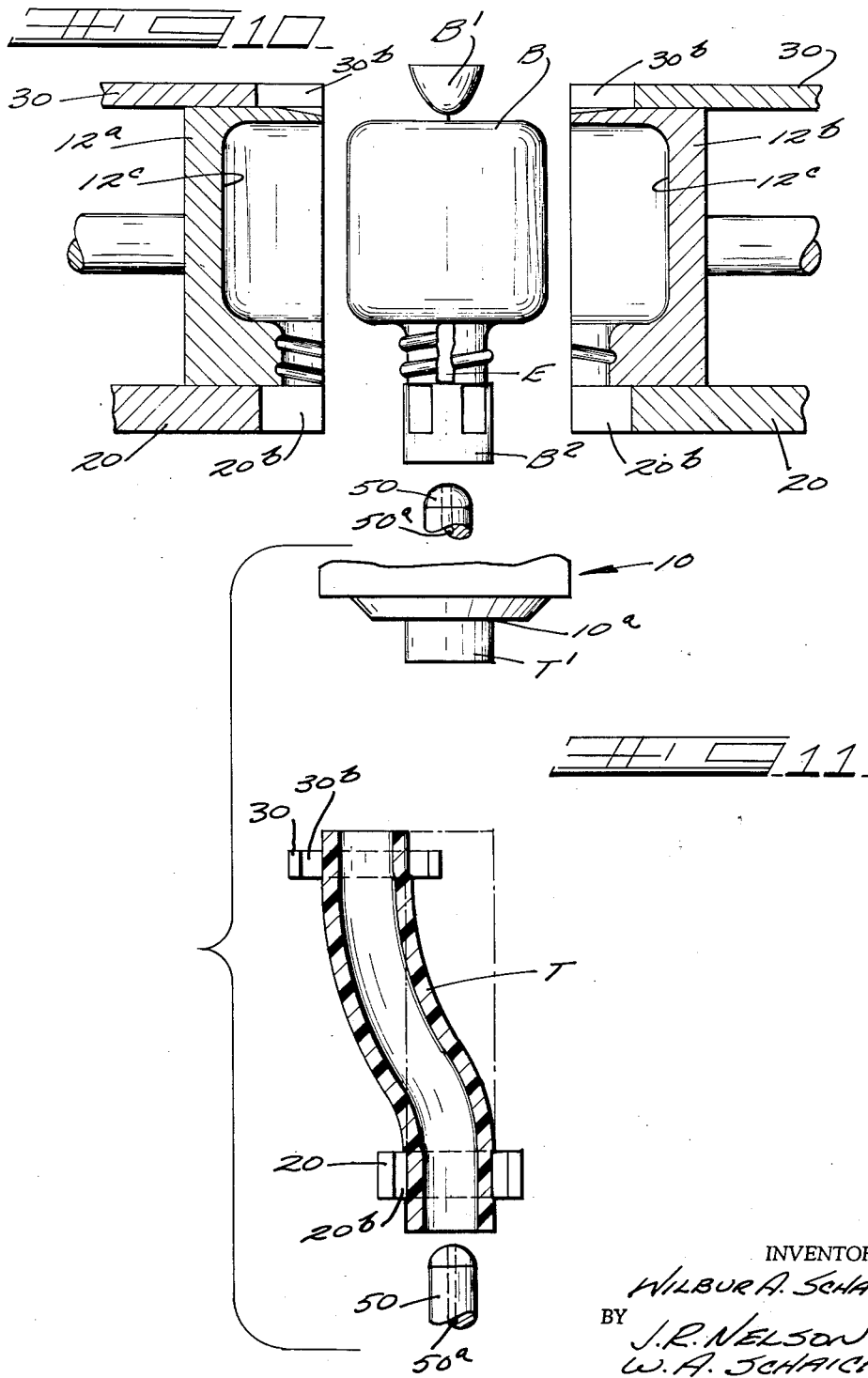

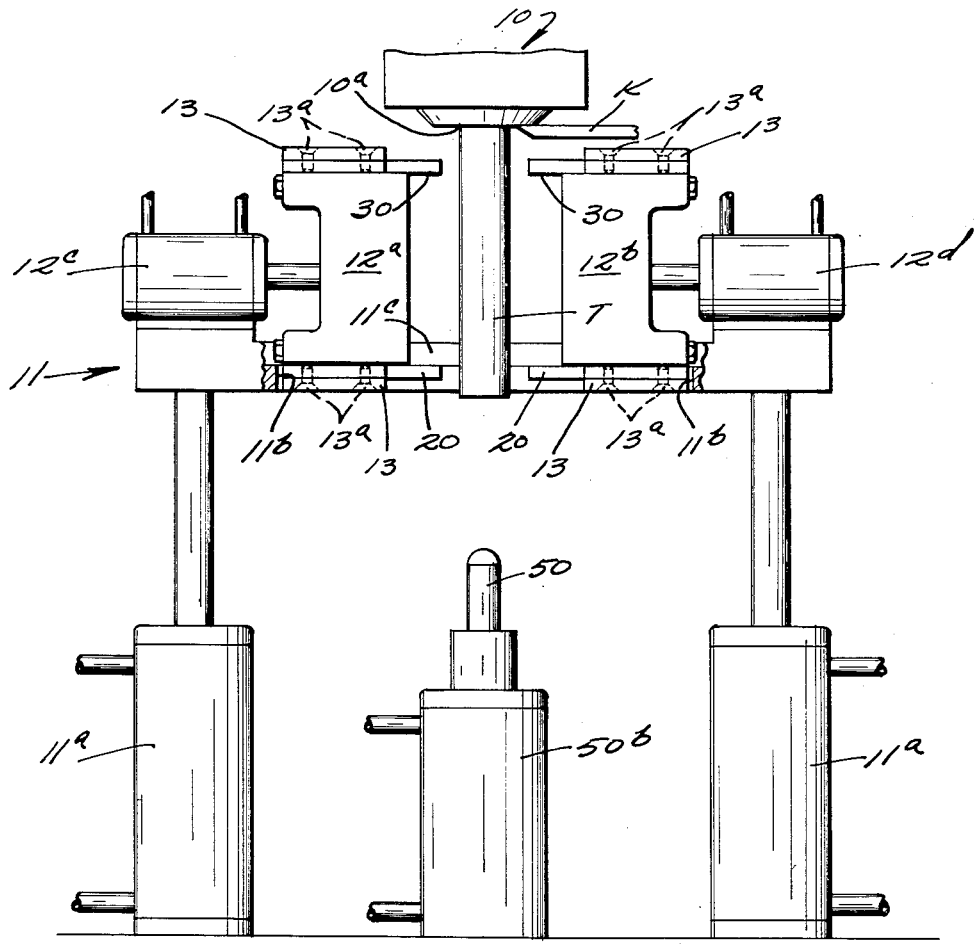

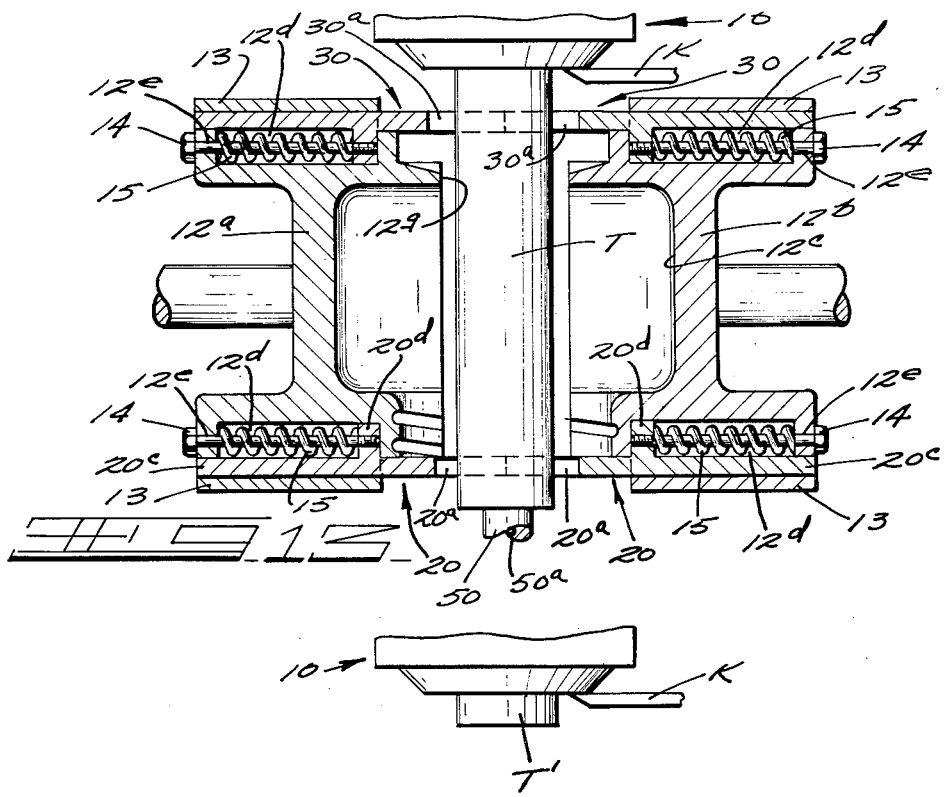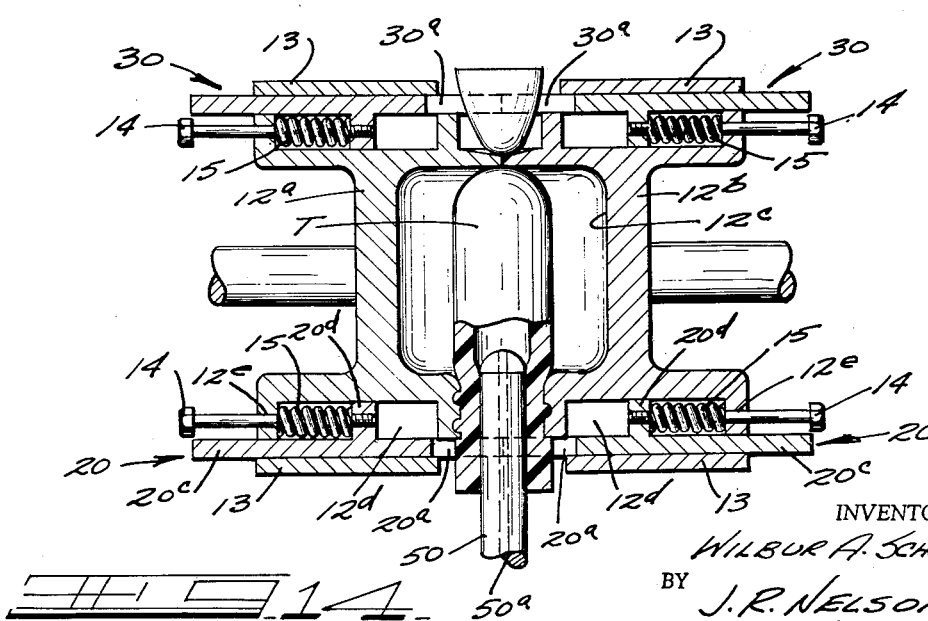

This invention relates to an improved method and apparatus for forming plastic articles by blowing a heated tube of thermoplastic material in a partible mold.

There have been many processes heretofore proposed and utilized for forming hollow plastic articles by expansion of a heated tube of thermoplastic material. Among the most popular processes that have been utilized is a process which utilizes an extruder having a horizontal orifice for vertically downwardly extruding a tube or rod of heated thermoplastic material. Such process has always suffered from an inherent disadvantage in that when the extruded tube or rod is heated to a temperature sufficient to permit subsequent expansion or molding thereof in a partible mold, the plastic material is so readily deformable that the weight of that portion of the tube or rod already extruded will effect an axial stretching of the portions of the rod or tubing issuing from the extruder orifice. This effect becomes progressively worse as the wall thickness, diameter, or length of the extruded plastic tube or rod is increased. Hence when the desired length has been extruded, there will be a marked difference in the wall thickness or diameter of the upper portions of the extruded tube or rod as compared with the lower portions thereof.

In all known molding processes utilizing a vertically extruded tube or rod of thermoplastic material as the starting point, the differential axial expansion of the tube or rod, due to its own weight, has been carried forward into the finished article, resulting in very serious problems of non-uniform wall thickness along the length of the finished article. For example, when forming containers from a vertically extruded tube of heated thermoplastic material, the container has been generally formed by utilizing the lowermost portions of the extruded tube to form the neck of the container and the uppermost portions to form the body and base of the container. Due to the differential stretching of the tubing during its extrusion, the wall thickness of the resulting container at the base of the container would be one-half or less the wall thickness at the neck or shoulder of the container. This, of course, is exactly the opposite of what is generally desired, since the base of the container is required to be fairly rigid and strong in order to support the container and its contents. To overcome this defect, it has been the practice with the known processes to extrude a tube of greater wall thickness than is necessary for the top portions or neck of the resulting container in order to have an adequate wall thickness of the base of the container. This procedure inherently results in a waste of material, since substantially more material than is required is thus placed in the neck and shoulders of the container.

Still another defect of known methods of forming hollow plastic articles from heated thermoplastic tubing is poor horizontal distribution encountered in the manufacture of articles having non-circular horizontal cross-sectional configurations. In such cases, the extruded tube, which is most conveniently extruded in the form of a cylinder, is required to expand unequally in the various radial directions to conform to the non-circular configuration of the desired article. In the case of a square bottle, this has resulted in the corners of the bottle being of substantially reduced wall thickness, as compared with the intermediate or panel portion of the bottle. Again, this is exactly contrary to what is desired in a properly designed container, for the corners thereof should always be the strongest part of the container and, hence, have a greater wall thickness than the remainder of the body of the container.

Accordingly, it is an object of this invention to provide a method and apparatus for forming hollow plastic articles from heated thermoplastic tubes which will overcome the aforementioned disadvantages.

A further object of this invention is to provide an improved method and apparatus for handling a heated, vertically extruded tube or rod of thermoplastic material prior to enclosing of such tube in a forming mold, the handling being accomplished in such manner that the upper portions of the tube or rod are permitted to shift axially in order to achieve at least a partial relief of the stresses and deformations that are inherently produced in the tube or rod due to its vertical extrusion.

Still another object of this invention is the provision of an improved method and apparatus for forming a hollow plastic article from a heated tube of thermoplastic material, characterized by a preshaping of the tube in cross-section to conform generally to the molding cavity, thereby permitting the subsequent expansion of the tube in a non-circular molding cavity without producing substantial variations in wall thickness of the resulting article.

Still another object of this invention is the provision of a fully automatic method and apparatus for continuously forming hollow plastic articles from thermoplastic tubing continuously produced by vertically directed extrusion, characterized by the substantial reduction of axial stresses inherently produced in the tube by its extrusion prior to blowing of the tube in the mold, and resulting in a substantial improvement in wall thickness distribution of the resulting blown article.

The specific nature of this invention, as well as other objects and advantages thereof, will be apparent to those skilled in the art from the following detailed description, taken in conjunction with the annexed sheets of drawings, on which are illustrated several embodiments of this invention.

On the drawings:

FIGURE 1 is a schematic vertical sectional view of a basic apparatus utilized to carry out the method of this invention, showing the first step, constituting the extrusion of a heated thermoplastic tube.

FIGURE 2 is a view similar to FIGURE 1, illustrating the next step in the method of this invention, wherein holding members are engaged with the heated thermoplastic tube.

FIGURE 3 is a view similar to FIGURE 1, but illustrating the next step in the method of this invention, wherein a length of tubing is severed from the extruder.

FIGURE 4 is a sectional view taken on the plane 4—4 of FIGURE 3.

FIGURE 5 is a sectional view taken on the plane 5—5 of FIGURE 3. FIGURES 5a and 5b are views similar to FIGURE 5, but illustrating modified configurations of the tube holding apertures.

FIGURE 6 is a view similar to FIGURE 1, illustrating the next step in the method of this invention, wherein a partible mold and a blowing mandrel are moved into proximity with the severed length of tubing.

FIGURE 7 is a vertical sectional view of a portion of FIGURE 6 illustrating the next step of the method of this invention, wherein a partible mold is closed on the severed length of tubing.

FIGURE 8 is a sectional view taken on the plane 8—8 of FIGURE 7.

FIGURE 9 is a view similar to FIGURE 7, but illustrating the blowing of the desired plastic article in the closed partible mold.

FIGURE 10 is a view similar to FIGURE 7, illustrating the final step of this invention, wherein the formed article is released from the partible mold and the tube holding members.

FIGURE 11 is a vertical sectional view taken in a plane at right angles to that of FIGURES 1 through 4 and illustrating a modification of this invention permitting a longitudinal pre-shaping of the heated thermoplastic tube.

FIGURE 12 is a vertical elevational view illustrating the major elements of a complete plastic blowing machine which has been modified to incorporate the improvements of this invention.

FIGURE 13 is an enlarged scale vertical sectional view of the mold segments and tube holding members utilized in the machine of FIGURE 12, the mold segments being shown in their open position.

FIGURE 14 is a view similar to FIGURE 13, but illustrating the partible mold segments in their closed position.

As shown on the drawings:

While this invention will be particularly described in connection with the formation of a hollow plastic container, such as a bottle, it should be distinctly understood that the principles thereof are equally applicable to the formation of any type of hollow article which can be blown from tubing in a partible mold. Hence, the invention may be readily applied to the manufacture of such items as toys, doll bodies, electrical fixtures, etc.

In its broadest aspects, this invention is based upon the realization that most commercially available thermoplastic materials, and particularly polyethylene, retain, even when heated to a temperature suitable for expansion in a blow mold, a substantial degree of elasticity. It follows, therefore, that when stresses are induced in a heated tube or rod of thermoplastic material, due to forces inherent in its extrusion, the material will, if given the opportunity, attempt to relieve such stresses, due to its own elastic memory.

Accordingly, when a tube or rod of thermoplastic material is extruded in a vertically downwardly direction from an extruder orifice, all portions of the extruded tube or rod are subjected to some degree of axial tension, due to the inherent weight of the tubular material, with the upper portion being stressed to the greatest extent. In accordance with the basic concept of this invention, a desired length of such tubing is severed, and then the severed length of such vertically extruded tubular thermoplastic material is supported in a substantially vertical position, by a supporting force applied only adjacent its lower portions, for a sufficient length of time to permit the upper portions of the severed length of tubing to move axially under the influence of the elastic memory of the material to relieve any axial stresses existing in the tubular material. As an alternative or a supplemental procedure, the vertical support for the bottom portions of the heated tubing may be applied prior to severing the tubing from the extruder orifice and the extruder is permitted to continue to extrude the tubing while the lower portion of the tubing is either immobilized or moved downwardly at a rate less than the rate of extrusion, and thereby some degree of axial compaction of the plastic material in the upper portions of the tubing is obtained. Due to the fact that most commercially available thermoplastic materials have a very small degree of rigidity at temperatures permitting the blowing of such materials, this last-mentioned procedure generally cannot be solely relied upon to completely overcome the axial elongation of the upper portions of the plastic material produced by the weight of the extruded tube, and the bottom portions of the tube should be supported for an interval after severing to permit the top portions of the severed tube to shift axially in response to any remaining axial stresses.

It will be apparent to those skilled in the art that the aforedescribed method can be applied to any type of plastic forming machine utilizing a vertically extruded rod or tube of thermoplastic material as the starting point of the forming operation. It can be used with either a continuous or discontinuous extruder operation. In the case of a continuous extruder operation, it is, of course, necessary to promptly move the severed length of plastic material to a remote position with respect to the extruder orifice in order to avoid interference between the oncoming extrusion and the severed length. The time involved in such transfer movement may be most conveniently utilized to accomplish the stress-relieving operation described above. In other words, during the movement of the severed length of plastic to its remote position with respect to the extruder orifice, the tube is supported in a generally vertical position, primarily by support applied to the lower portions of the severed tube, while the upper portions are free to shift axially to relieve any stress therein. Upon arrival at the remote position, the stresses will be substantially relieved, and a partible mold may be promptly closed around the substantially stress-free length of tube. Still another advantage of this invention may be derived in the blow molding of articles of non-linear longitudinal configuration, such, for example, a curved arm for a doll, a container having an integral curved spout, a bed urinal, etc. While the bottom portion of the vertically extruded tubing is grasped and supported in the manner described, the top portion may be guided, without interfering with the axial shrinkage thereof, to a position horizontally displaced from the bottom portion, thus causing the tube to assume a curve configuration in a vertical plane to more closely correspond to the non-linear configuration of the mold cavity.

The methods of this invention thus far described have dealt primarily with minimizing vertical variations in wall thickness of the hollow plastic article blown from vertically extruded tubing. According to another aspect of this invention, an improved wall thickness distribution in a horizontal plane may be achieved, particularly for articles of non-circular configuration. This desirable improvement is accomplished by contacting the heated thermoplastic tube, prior to closing of the partible blow mold therearound, with a shaping element which distorts or preshapes the side walls of the tube to a cross-sectional configuration generally conforming to that of the desired article, or, to put it another way, generally conforming to the cross-sectional configuration of the cavity of the partible mold in which the tubing will be blown. The simplicity and desirability of this invention is emphasized by the fact that this preshaping operation can be accomplished by the same means and at the same time as the stress-relieving operation. Thus, the mechanism which grasps and supports the lower portions of the severed length of tubing may be shaped to impart to the tubing a cross-sectional configuration generally conforming to that of the cavity of the partible mold. While the tubing is only contacted or grasped at a limited localized region, I have observed that any deformation of the wall of the tubing, when it is in such a heated condition, progresses axially along the length of the tubing to a very substantial extent. Hence, a localized deforming contact with the tubing may be employed to change the cross-sectional configuration of substantially the entire severed length of the tubing. This permits the severed length of tubing to be enclosed in a blow mold while an end portion of it is still held by the preshaping grasping means. This has the further advantage of permitting all portions of the tubing which are to be blown to be free from extraneous chilling contacts, and, hence, eliminates any non-uniformities due to temperature differences in the various portions of the tubing being blown.

Referring now to the drawings, FIGS. 1–11 thereof illustrate schematically the steps involved in the practice of the methods of this invention.

A conventional extruder 10 is provided having a horizontal annular orifice 10a capable of issuing a vertical pendent length of heated thermoplastic tubing T. As is inherent in every vertical extrusion of a heated tube or rod of thermoplastic material, the weight of the material already extruded produces a differential axial stress throughout the length of the extruded material, which results in the upper portions of the extruded material having thinner wall sections and/or diameters than the lower portions. This effect has been illustrated in somewhat exaggerated form in FIGURES 1 and 2 of the drawings by a substantial increase in wall thickness of the lower portions of the tubing T with respect to the upper portions of such tubing. The exact differential in such wall thickness will, of course, be a function of the diameter, length and wall thickness of the tube being extruded, with the upper portions of the tube becoming increasingly smaller as any of the aforementioned other dimensional factors of the tube are increased.

In accordance with this invention, the freely pendent heated thermoplastic tube T is extruded between two vertically-spaced pairs of horizontally aligned holding members schematically indicated respectively at 20 and 30 (FIGURES 1, 4 and 5). The lower pair of holding members 20, as best shown in FIGURE 5, are respectively provided in their opposed vertical surfaces with identical tube-engaging notches 20a of generally tapered configuration. The outer ends of the notches 20a are preferably of substantially greater width than the diameter of the thermoplastic tubing T, so as to readily accommodate any misalignment of the tubing T from the vertical extrusion axis. The tapered wall portions 20b of the notches 20a are, however, suitably shaped so as to effect a guiding or alignment of the thermoplastic tube to a desired position with respect to the partible mold, as will be later described. In any event, when the bottom pair of tube holding members 20 are moved toward each other into abutting relationship (FIGURES 2 and 5), the cooperating notches 20a define an aperture which is somewhat smaller in width than the diameter of the extruded thermoplastic tube T so that the lower portions of such tube are grasped with sufficient firmness by the bottom holding members 20 as to provide vertical support for the extruded length of tubing T. The top pair of tube holding members 30 are similarly provided with tapered tube-engaging notches 30a, but when the top holding members are moved into abutment, the notches 30a define an aperture which is preferably slightly larger than the adjacent top portions of the extruded tubing T so that the top holding members do not impart any vertical support or restraint to the heated thermoplastic tubing T, but merely provide lateral support.

The bottom and top pairs of holding members 20 and 30 are illustrated in FIGURE 2 in their closed, tube-engaging positions. Such closing action of the holding members may be accomplished concurrently, or, if desired, the bottom holding members 20 can be closed somewhat in advance of the top holding members 30. In either case, if the extruder 10 is of the continuous type, and the tube severing step is not immediately performed, the resultant vertical support imparted to the bottom portions of the extruded tubing T by the bottom holding members 20 will cause the oncoming plastic to tend to thicken or at least produce some degree of axial compaction at the upper portions of the extruded tubing T. Of course, when extruding any of the commercially available polyethylene materials, at temperatures permitting the subsequent expansion of the polyethylene in a mold, no great amount of axial compaction can be achieved, since the extruding tube T has very little rigidity and would tend to bend or deform laterally. Nevertheless, the expedient of supporting the bottom portions of the tubing for a limited time while continuing the extrusion will assist to some degree to overcome the differential stretching inherently suffered by the top portions of a vertically extruded heated thermoplastic tube.

The next step of this invention is schematically illustrated in FIGURE 3 and constitutes the severing of the tubing T from the extruder orifice 10a by a suitable knife or wiping element K. Preferably, the severing is accomplished in such manner as to leave both severed ends of the tubing open. Due to the fact that the bottom portions of the severed length of tubing T are vertically supported by the bottom holding members 20, while the top portions of such tubing are merely laterally supported by the top holding members 30, the severed length of tubing T will immediately tend to axially shrink in response to the stresses which were previously induced therein by the weight of the tubing when pendant, and now in response to its own weight when bottom supported, and the upper portions of the tubing T will shift axially with respect to the bottom portions to produce a substantial increase in the wall thickness of such upper portions relative to the wall thickness of the lower portions of the tubing, as illustrated in FIGURE 3. In most cases, a complete recovery of the differential in wall thickness produced in the tubing T by its own weight cannot be achieved, but due to the fact that the lower portions of the tubing T are inherently colder than the upper portions, a greater degree of axial shrinkage will occur in the upper portions of the tubing; hence, a very substantial increase in wall thickness of the upper portions of the severed length of tubing T is achieved over that which normally existed prior to the severing of the tubing from the extruder.

If the extruder 10 is of the continuous type, which permits the most efficient operation of the entire process, it is necessary to relatively move the severed length of tubing T away from the extruder orifice in order to keep the severed length spaced from the oncoming new extrusion, indicated at T' in FIGURE 6. In accordance with a well-known method, the severed length of tubing T may be most conveniently moved axially away from the extruder orifice at a rate exceeding the rate of extrusion and hence, provide sufficient clearance for a new length of tubing T' to be extruded while the severed length T is being blown in a partible mold. As illustrated in FIGURE 6, such movement may be conveniently accomplished by concurrently moving the top and bottom pairs of holding members 20 and 30.

The vertical spacing between such pairs of holding members may be utilized to permit a pair of partible mold segments 12a and 12b to be brought into surrounding relationship with respect to the severed length of tubing T. Concurrently with the arrival of the severed length of tubing T at the remote position relative to the orifice illustrated in FIGURE 6, or immediately thereafter, a blow nozzle 50 may be inserted in the bottom open end of the severed length of tubing T to facilitate the subsequent expansion of the tubing within the partible mold. Such vertically downward movement of the severed length of tubing T while engaged only by the lower and upper holding members 20 and 30 provides additional opportunity for the severed length of tubing T to recover from the differential axial stresses that it had suffered during its extrusion. The inertia effects of suddenly stopping such downward movements of the severed length of tubing T at the remote position can also contribute to axial compaction of the upper portions of the tubing.

As schematically illustrated in FIGURE 7, the partible mold segments 12a and 12b are then closed about the severed length of tubing T. The top edges 12g of such mold segments are shaped to effect a pinching and sealing of the top portions of the tubing T, as illustrated in FIGURE 7. If the tubing T is of greater diameter than the desired neck portion of the article being produced, here illustrated by the bottle-shaped cavity 12c defined by the partible mold segments, the closing of the mold segments produces a compression of the tubing T around the blow nozzle 50, and the excess plastic shown at E in FIGURE 8 is squeezed out into external recesses 12r provided in the mold segments. Such compression of the tubing T around the blow nozzle 50 is, however, not essential to the methods of this invention, since the diameter of the tubing T may be selected to be smaller than the neck portion of the mold cavity 12c in which case such neck portion will be produced entirely by blowing of the plastic in the closed mold.

After closing of the partible mold sections 12a and 12b, blow air or other suitable pressured fluid is applied through the axial passage 50a in the blow nozzle 50 to expand the plastic tube T to conform to the mold cavity 12c. After suitable cooling of the expanded thermoplastic material to permit it to achieve the desired degree of solidification, the mold segments 12a and 12b are moved apart, as illustrated in FIGURE 10, to release the formed article B, and concurrently the top and bottom pairs of holding members 20 and 30 are moved horizontally outwardly to release the end portions of the tube so that the finished article, illustrated at B in FIGURE 10, is produced having excess plastic portions B1 and B2 respectively attached to its top and bottom ends and excess ears E attached to the neck. Such excess plastic may be trimmed from the formed article B manually or in any one of a variety of well-known procedures, such trimming being accomplished either prior to opening of the partible mold segments or as an entirely separate operation on the article B.

Referring now to FIGURES 12 through 14, there is schematically illustrated a complete machine of a type which is well known and currently offered on the market which has been modified to operate in accordance with the methods of this invention. Such machine is more particularly described and illustrated in my copending application Serial No. 768,526, filed October 16, 1958, and assigned to the asignee of this invention. As described before, an extruder 10 is provided which is capable of issuing a freely pendent vertical tube T of heated thermoplastic material. A mold bed 11 is provided which is capable of vertical movements relative to the extruder orifice 10a. Preferably, mold bed 11 comprises a horizontal platelike element which is supported by a pair of vertically-disposed fluid pressure cylinders 11a which effect upward and downward movements of the mold bed 11 as required to comply with the method of this invention. In the central portion of the mold bed 11, an elongated slot 11b is provided which is of substantially greater width than the extruded thermoplastic tube T, so as to permit the free end of such tubular formation to freely pass through such slot, even though such tube may curl substantially out of axial alignment with the extrusion axis.

A pair of partible mold sections 12a and 12b are provided which, when closed, define a molding cavity 12c corresponding to the configuration of the plastic article desired. Mold sections 12a and 12b are laterally shiftable with respect to the mold bed 11 and may, if desired, be directly mounted on mold bed 11 for horizontal sliding movement with respect thereto. For example, each mold section 12a and 12b may slide between a pair of upstanding guide members 11c formed on the top surface of mold bed 11 and the bottom portions of each mold section projects into slot 11b. A pair of fluid-actuated cylinders 12c and 12d are respectively provided for the mold sections 12a and 12b and control the lateral shifting movements of such mold sections relative to the mold bed 11.

The top and bottom faces of the mold sections 12a and 12b are respectively utilized to mount the pairs of tube holding members 20 and 30. Such holding members are preferably constructed and mounted in the same manner as disclosed and claimed in the copending application of Elmer L. Adams and Richard C. Gasmire, Serial No. 790,099, filed January 30, 1959, and assigned to the assignee of this invention. The bottom faces of mold sections 12a and 12b are respectively provided with elongated recesses 12d. Each bottom holding member 20 has a rectangular stem portion 20c slidably received in the corresponding recess 12d and is retained in such recess by a cover plate 13 which is bolted to the corresponding mold section by bolts 13a. An upwardly projecting lug 20d is formed on each holding member 20 which receives the threaded end of a spring guide bolt 14 which passes into the mold recess 12d through a suitable aperture 12e in the end wall thereof. A spring 15 is mounted on the guide bolt 14 and functions to bias the corresponding tube holding member 20 in a forwardly projecting position relative to its corresponding mold segment.

The upper pairs of tube holding members 30 are respectively mounted on the top surface of the mold sections 12a and 12b in an identical manner as heretofore described for the bottom holding members 20.

The bottom pairs of tube holding members 20 each define a tube engaging notch 20a in their opposed vertical surfaces, which notches, when the bottom holding members 20 are in abutment, cooperate to engage and vertically support the lower portions of the extruded tube T, in the same manner as heretofore described. The top holding members 30 are provided with tube-engaging notches 30a which cooperate, when the top holding members are in abutment, to provide lateral support for the thermoplastic tubing T but do not restrain any vertical or axial movements thereof.

A blow head 50 is provided to cooperate with the bottom open end of the tubing T, and the vertical position of blow head 50 is controlled by a fluid cylinder 50b.

Starting with the elements of the machine positioned as shown in FIGURE 12, wherein a full length of tubing T has already been extruded, the operation of the machine proceeds as follows: The mold sections 12a and 12b are moved toward each other but not closed, as illustrated in FIGURE 13, so as to bring both the top and bottom pairs of tube holding members into abutting relationship and hence, into operative engagement with the thermoplastic tubing T. The severing knife K is then actuated by any suitable mechanism (not shown), and the severed length of tubing T is then primarily supported by the bottom holding members 20. Immediately subsequent to the severing operation, the mold bed 11 is lowered by actuation of the cylinders 11a to shift the severed length of tubing T into a remote position with respect to the extruder orifice 10a and hence, prevent interference with the oncoming extrusion T. During this movement, the severed length of tubing T is provided with adequate opportunity to shift and shrink axially to recover from the stresses induced therein by its own weight during the extrusion. When sufficient recovery has been achieved, the mold sections 12a and 12b are moved together to their closed position, illustrated in FIGURE 14, by the respective cylinders 12c and 12d. Prior to such closing, the blow head 14 is caused to enter the lower open end of the severed length of tubing T.

In other words, the extruded tubing T is grasped and supported by the pairs of holding members 20 and 30 at its ends; the grasped length of tubing is severed from the oncoming tubing by knife K in such manner as to leave the severed ends open; the severed length of tubing is moved axially away from the extruder orifice 10a by the holding members to a remote position; the mold sections 12a and 12b are then closed on the severed length of tubing intermediate the grasped end portions, thus pinching and sealing one end of such severed length; and the mold enclosed portions of the severed length of tubing are expanded to conform to the mold cavity by pressured fluid introduced through the remaining open end of the mold enclosed length of plastic tubing. Obviously, it is the provision of the spaced pairs of tube holding members 20 and 30 that permits the convenient axial transfer of the severed length of tubing to a remote position without necessitating the addition of any complex transfer mechanism to the basic apparatus.

Upon closing the mold sections 12a and 12b, the upper portion of the tubing T is pinched and sealed by the mold walls 12g, and blowing fluid is applied to the interior of the tube T through blow nozzle 50. Thus the tubing T is expanded to the configuration defined by the cavity 12c of the mold sections 12a and 12b. After cooling and setting of the expanded thermoplastic material, the mold sections 12a and 12b are moved laterally apart to the positions shown in FIGURE 12 to concurrently release the formed article from the mold cavity and from the bottom and top pairs of tube holding members 20 and 30. The blow head 50 is concurrently retracted, so that the formed article may be entirely removed from the machine. The mold bed 11 is then raised by its cylinders 11a to the starting position illustrated in FIGURE 12, wherein the holding members and mold sections are spaced around the next length of tubing which has been extruded during the aforedescribed blowing and cooling operations.

Still another advantage of the methods of this invention may be derived from a special construction of the holding members in the manner illustrated in FIGURES 5a and 5b. I have observed that any lateral force applied to the heated thermoplastic tubing T at a localized region thereof will spread a substantial distance along the length of the tubing. Accordingly, if it is desired to produce an article having a non-circular horizontal cross-section, the tubing T may be caused to assume a cross-sectional configuration coresponding generally to that of the desired article by appropriate shaping of the tube engaging notches of the holding members, and particularly the notches in the bottom pair of tube holding members 20. For example, to produce an oval-shaped article, the holding members 20 should be provided with a semi-oval-shaped notch 20e, as illustrated in FIGURE 5a, with, of course, the large axis of the oval being aligned with the abutting end faces of the holding members 20. In like manner, a desired article having a hexagonal shape may be more efficiently produced by utilizing notches 20f in the holding members of semi-hexagonal shape, as illustrated in FIGURE 5b. In any event, the preforming of the horizontal cross-sectional configuration of the heated thermoplastic tube T to generally correspond to the cross-sectional shape of the article being produced has been found to greatly facilitate the blowing of such article and to substantially improve the wall thickness distribution in the resulting article.

Still another embodiment and advantage of this invention is schematically illustrated in FIGURE 11, wherein the severed length of tubing T has been engaged by the bottom and top holding members 20 and 30 respectively. During the movement of such holding members and the supported tube T to a remote position with respect to the extruder orifice, it is possible to laterally shift the top holding members relative to the bottom members so that the heated thermoplastic tube is caused to assume a nonlinear longitudinal configuration, as illustrated in FIGURE 11. This procedure will be of substantial advantage in the molding of articles having non-linear longitudinal configurations, for the heated thermoplastic tubing T can thereby be caused to assume a longitudinal shape conforming generally to that of the desired article to again facilitate the blowing of such article and substantially improve the wall thickness distribution in the resulting article.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. The method of forming a hollow plastic article comprising vertically downwardly extruding a tube of thermoplastic material at a temperature permitting expansion and setting in a mold, severing a length of said extruded tube, engaging a lower portion of the severed length of tube to support the severed length in a substantially vertical position while permitting the upper portions of the severed length of tube to move axially to relieve stresses in said severed length of tube, enclosing a medial portion of said severed length of tube in a partible mold, and expanding said medial portion of said severed tube length to conform to the cavity of said partible mold.

2. The method of forming a hollow plastic article comprising vertically downwardly extruding an open end tube of thermoplastic material at a temperature permitting expansion and setting in a mold, grasping a lower portion of the extruding tube, severing the tube at a point above the grasping point, supporting the severed length of tube in a substantially vertical position while permitting the upper portions of the severed tube length to move axially to relieve stresses in said severed tube length, closing a partible mold around a medial portion of said severed length of tube, and applying fluid pressure to the interior of the severed length of tube to expand the medial portion of said severed length of tube to conform to the cavity of said partible mold.

3. The method of forming a hollow plastic article comprising continuously vertically downwardly extruding a tube of thermoplastic material at a temperature permitting expansion and setting in a mold, severing a length of said extruded tube, supporting the severed tube length in a substantially vertical position while permitting the upper portions of the severed length of tube to move axially to relieve stresses in said severed length of tube, concurrently moving the severed length of tube to a remote position relative to the point of extrusion of the plastic tube, thereby spacing apart the severed ends of the tube, enclosing a medial portion of said severed length of tube in a partible mold, and expanding said medial portion of said severed length of tube to conform to the cavity of said partible mold.

4. The method of forming a hollow plastic article comprising vertically downwardly extruding a tube of thermoplastic material at a temperature permitting expansion and setting in a mold, grasping a length of the extruded tube at two vertically spaced regions, the lower grasping action being sufficient to provide vertical support for the severed length of tube and the upper grasping action being sufficient to provide horizontal support for the severed length of tube, severing the tube above the upper grasping region thereby permitting the upper portions of the severed length of tube to move axially to relieve stresses in said severed length, enclosing the medial portions of said severed length of tube in a partible mold, and expanding said medial portion of said severed length of tube to conform to the cavity of said partible mold.

5. The method of forming a hollow plastic article comprising continuously vertically downwardly extruding a tube of thermoplastic material at a temperature permitting expansion and setting in a mold, grasping a length of the extruded tube at two vertically spaced regions, the lower grasping action being sufficient to provide vertical support for a severed length of tube and the upper grasping action being sufficient to provide only horizontal support for a severed length of tube, severing the tube above the upper grasping region thereby permitting the upper portions of the severed length of tube to move axially to relieve stresses in said severed tube length, concurrently moving the severed length of tube to a remote position relative to the point of extrusion of the tube, thereby spacing apart the severed ends of the tube, enclosing the medial portions of said severed tube length in a partible mold, and expanding said medial portion of said severed tube length to conform to the cavity of said partible mold.

6. The method of forming a hollow plastic article comprising vertically downwardly extruding a tube of thermoplastic material at a temperature permitting expansion and setting in a mold, grasping a lower portion of the extruding tube to support same while continuing the extrusion, thereby producing some degree of axial compaction of the tube, severing a length of tube, continuing the support of the lower portions of the severed length while permitting the top portions of the severed tube length to move axially to relieve stresses in said severed tube length, enclosing a medial portion of said severed tube length in a partible mold, and expanding said medial portion of said severed tube length to conform to the cavity of said partible mold.

7. The method of forming a hollow plastic article by blowing in a partible mold comprising vertically downwardly extruding a tube of thermoplastic material at a temperature permitting expansion and setting in a mold, severing a length of said extruded tube, supporting the severed length in a substantially vertical position while permitting the top portions of the severed tube length to move axially to relieve tensile stresses in said severed tube length and concurrently preshaping said tube in cross-section to conform generally to the cross-sectional shape of the cavity of the partible mold, enclosing a medial portions of said severed tube length in the partible mold, and expanding said medial portion of said severed tube length to conform to the cavity of the partible mold.

8. In the art of forming plastic articles from vertically downwardly extruded, heat-softened, thermoplastic tubing, the method of reducing the differential in wall thickness inherently produced in the top portions of the extruded tubing due to the weight of such tubing, which comprises severing a length of such tubing and supporting the severed length of tubing only adjacent the lower portions thereof for a period sufficient to permit axial shrinkage of the upper portions of the severed length of tubing.

9. In the art of forming plastic articles from vertically downwardly extruded thermoplastic tubing, the method of reducing the differential in wall thickness inherently produced in the top portions of the extruded tubing due to the weight of such tubing, which comprises vertically supporting the lowermost portions of the extruded tubing while continuing the extrusion to produce some degree of axial compaction of the extruded tubing, severing a length of such tubing at the upper portions thereof, and vertically supporting the severed length of the tubing only adjacent the bottom portions thereof for a period sufficient to permit axial movement of the upper portions of the severed length of tubing in response to stresses therein.

10. In the manufacture of a hollow plastic article by expanding a heated, freely extruded, thermoplastic tube in a partible mold, the improvement comprising contacting a portion of said tube with a shaping member and distorting the walls of such tube at the point of contact to a cross-sectional configuration generally corresponding to the cross-sectional shape of the cavity of the partible mold, and then enclosing said tube in the partible mold and expanding the tube to conform to the mold cavity.

11. In the manufacture of a hollow plastic article by expanding a heated thermoplastic tube in a partible mold, the improvement comprising grasping a portion of said tube in such manner as to distort the walls of a portion of such tube to a cross-sectional configuration generally corresponding to the cross-sectional shape of the cavity of the partible mold, enclosing said tube portion in the partible mold, while maintaining said grasping action, and then expanding said tube to conform to the partible mold cavity.

12. Apparatus for forming hollow plastic articles from a freely pendant, vertically extruded tube of heated thermoplastic material comprising a partible mold having horizontally shiftable segments disposed on opposite sides of said tube and movable between an open position remote from the tube and a closed position enclosing the tube, a first tube holding unit disposed below said mold and having means thereon for grasping said tube and providing vertical support therefor, a second tube holding unit disposed above said mold and having means thereon for engaging said tube to provide essentially only horizontal support for said tube, and means for severing said tube above said second tube holding unit prior to closing said mold, whereby the upper portions of the severed tube are free to move axially to relieve stresses therein, said grasping means for said first tube holding unit having a tube-engaging surface shaped to deform the walls of the tube to a cross-sectional configuration corresponding more closely to the cross-sectional shape of the partible mold cavity than does the originally extruded tube.

13. In the art of forming plastic articles having a non-linear longitudinal configuration, the steps of vertically downwardly extruding a tubular length of heated thermoplastic material, severing a length of such tubing, vertically supporting the severed length of tubing only adjacent the bottom portions thereof, moving the top portions of the tubing laterally relative to the bottom portions to distort the length of tubing to a non-linear longitudinal configuration conforming generally to that of the desired article, and enclosing and expanding said severed length of tubing in a partible mold.

14. Apparatus for forming hollow plastic articles from a freely pendant, vertically extruded tube of heated thermoplastic material comprising a partible mold having horizontally shiftable segments disposed on opposite sides of said tube and movable betwen an open position horizontally remote from the tube and a closed position enclosing the tube, a pair of tube holding units respectively mounted on the top and bottom portions of said partible mold, each of said tube holding units having means thereon for grasping said tube when said mold segments are moved toward said closed position, means for severing said tube above the uppermost tube holding unit after said tube is engaged by said tube holding units, and means for moving said partible mold axially downwardly with respect to the plastic tube to space apart the severed ends, whereby said partible mold may be closed on the severed length of tubing at any desired time subsequent to the severing of the tube.

15. The method of forming hollow plastic articles comprising issuing a hollow open-ended substantially tubular formation of thermoplastic material from an orifice, said material of the issued formation being in a condition of plasticity to permit expansion and setting in predetermined form, severing a length from said tubular formation in such manner as to leave both severed ends of said formation open, the severed length being substantially longer than the length of the desired article, grasping the severed length of tubing at both ends thereof, substantially coincident with the completion of severing moving the grasped and severed length of tubing axially away from the orifice to space apart the severed ends, enclosing those portions of severed length of tubing intermediate the grasped end portions within a partible mold, pinching and sealing said severed length at a point thereon within the partible mold, and expanding the mold enclosed portions of the severed length of tubing to conform to the cavity of the partible mold by applying pressured fluid through the remaining open end of said severed length of tubing.

16. In a method of making a blown plastic article at least partially of non-circular cross-sectional configuration from a length of plastic tubing of substantially circular cross section and at a temperature permitting expansion and setting in a mold, the steps of engaging the tubing length with an element having tube-contacting surfaces of non-circular contour, maintaining contact between said surfaces and the tubing length for a period of time sufficient to distort the tubing length from its circular contour to a non-circular contour more closely approaching that of said article, enclosing the distorted tubing length in a partible blow mold, and inflating the tubing length interiorly of said blow mold.

17. In a method of making a blown plastic article at least partially of non-circular cross-sectional configuration from a pendant length of extruded plastic tube of substantially circular cross section and at a temperature permitting expansion and setting in a mold, the steps of engaging axially spaced portions of the tube with separate supporting elements having tube-contacting surfaces of non-circular contour, severing the engaged tube from the extrusion orifice, supporting the severed tube by said elements for a period of time sufficient to accommodate axial shrinkage of the upper portions of the severed length of tubing and to distort the tube from its circular contour to a non-circular contour more closely approaching that of said article, enclosing in a partible blow mold that portion of the tube intermediate the engaged portions thereof, and blowing the mold enclosed portions of the tube to the configuration of said article.

18. In a method of making a blown plastic article of at least partially non-circular cross-sectional configuration from a heat-softened thermoplastic tube, the steps of distorting a plurality of localized portions of the tube from the original circular cross-sectional configuration of the tube to a non-circular cross-sectional configuration more closely approaching that of said article, continuing the distortion of said localized portions until the tube portions therebetween assume a corresponding non-circular cross-sectional configuration, and then enclosing and inflating in a partible blow mold those tube portions between said localized portions.

References Cited in the file of this patent

UNITED STATES PATENTS

| | | |
|---|---|---|
| 1,504,653 | Taylor | Aug. 12, 1924 |
| 2,262,612 | Kopitke | Nov. 11, 1941 |
| 2,783,503 | Sherman | Mar. 5, 1957 |

FOREIGN PATENTS

| | | |
|---|---|---|
| 1,029,586 | France | Mar. 11, 1953 |
| 1,104,304 | France | June 8, 1955 |
| 1,105,529 | France | July 6, 1955 |
| 1,126,231 | France | July 23, 1956 |
| 744,927 | Great Britain | Feb. 15, 1956 |